Figure 1:
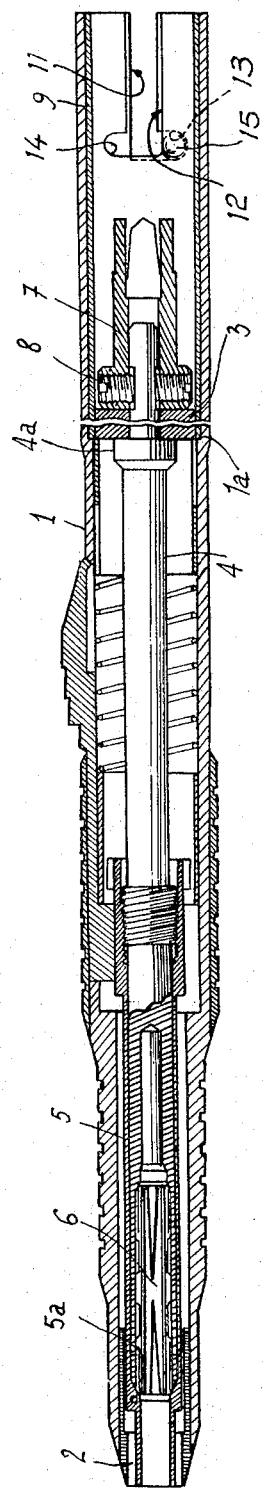

Jan. 3, 1967  H. LEONARD  3,295,207
DENTAL HEAD ASSEMBLY
Filed June 26, 1963  2 Sheets-Sheet 2
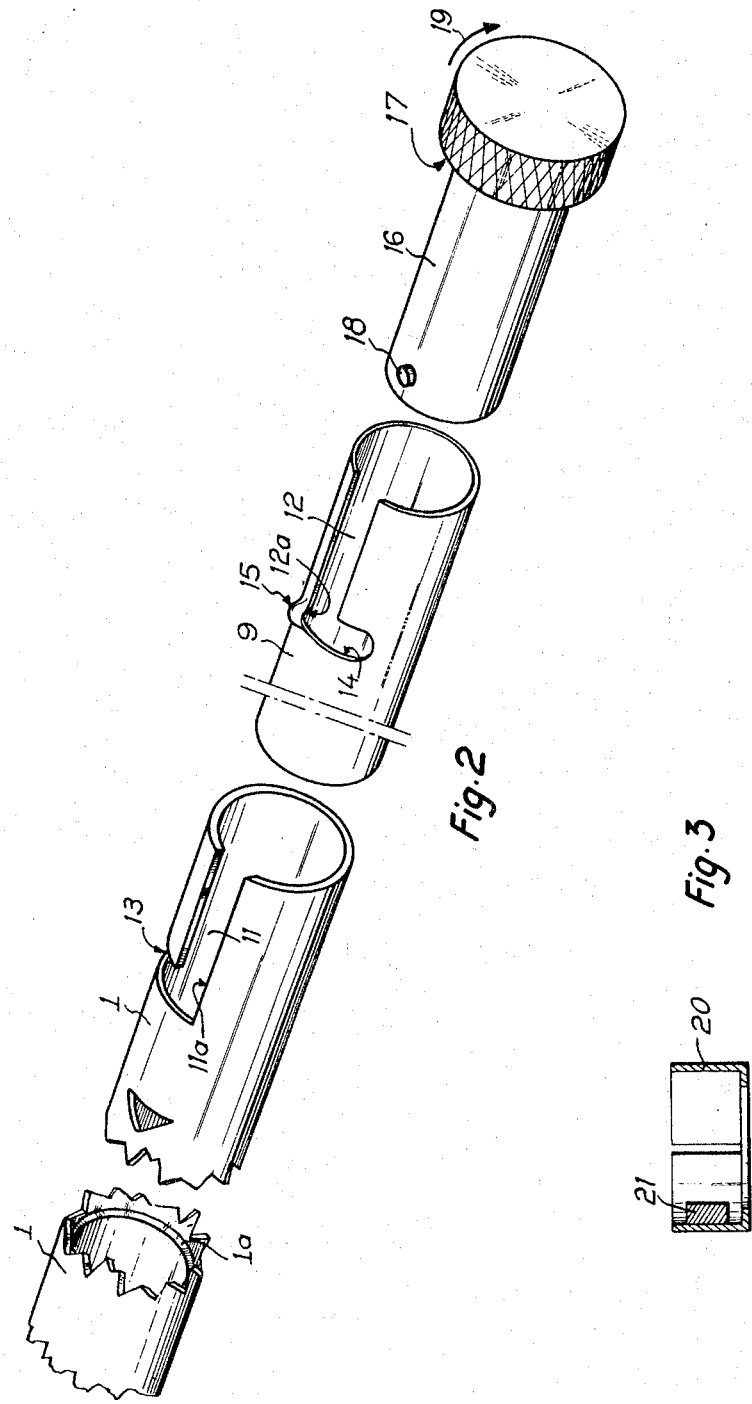

United States Patent Office 3,295,207
Patented Jan. 3, 1967

3,295,207
DENTAL HEAD ASSEMBLY
Henri Leonard, Besancon, France, assignor to Société Anonyme Micro-Mega, Besancon (Doubs), France, a French company
Filed June 26, 1963, Ser. No. 290,671
Claims priority, application France, Oct. 12, 1962, 912,025
3 Claims. (Cl. 32—26)

In my prior Patent No. 2,865,101, filed July 12, 1957 and entitled "Dental Engine Head Assembly" I described dental head assemblies in which the rear bearing is movable and forms a longitudinal stop for the shaft of the said assembly. The front surface of the rear bearing bears on a stop and is held in place by a sleeve housed in the body of the assembly, this sleeve just touching the rear end of the latter.

It is one object of the present invention to provide modifications or improvements in the said dental head assembly.

According to one of these improvements, the rear bearing is housed in the sleeve and the front surface of the sleeve bears on a stop.

According to another improvement, the sleeve housing the bearing is removably secured in the body of the dental head assembly by means of a bayonet joint.

If the drive means of the wrist is mounted with some force in the driver means of the dental head assembly, the foregoing arrangement ensures that the two driver means will not lock together and thereby withdraw the spindle from the head assembly when the wrist is separated from the dental head assembly.

In order that the invention may be more clearly understood, reference will now be made to the accompanying drawings, which show one embodiment thereof by way of example, and in which:

FIGURE 1 is an axial section through a dental head assembly according to the invention, FIGURE 2, is a perspective view showing the rear end of the assembly shown in FIGURE 1, the bearing fixing sleeve and the assembly key, these elements being shown separated for greater clarity, and FIGURE 3 is a section of a plug enabling the sleeve to be fixed with respect to the assembly.

Referring now to the drawings, the dental head assembly may be adapted to fit on a wrist-joint, and comprises a tubular body 1 in which bearings 2 and 3 are arranged.

A rotatable spindle 4 is mounted in the bearings 2 and 3, a sleeve 5 being screwed onto the front part of the said spindle and the said spindle comprises a seating for a double pincer 6 at its front end.

The sleeve 5 has an inner conical portion 5a so that screwing the sleeve 5 onto the spindle causes the pincer jaws to move inwardly in a gripping action.

At its rear end, the spindle 4 has turn screw driver means 7 secured to the spindle by screws 8.

The rear bearing 3 is fixed between a shoulder 4a on the spindle and the driver means 7, and is housed in a split flexible retainer sleeve 9 which bears on an inner shoulder 1a on the body 1. This retainer sleeve 9 constitutes a spacer and terminates at the rear end of the body 1. By means of this arrangement, when the assembly is mounted on the wrist, the latter prevents the sleeve 9 from leaving the body, the bearing 3 thus being fixed. At its rear end, the body 1 has a longitudinal slot or opening 11 in the usual manner, this opening being intended to allow the wrist spring to pass therethrough. The wrist spring enables the wrist to be engaged with the assembly. The sleeve 9 also has at its rear end a longitudinal slot or opening 12 which has the same dimensions as the slot or opening 11 and is substantially in register with the latter when the assembly is assembled.

The slot or opening 11 in the body 1 has a lateral or transverse extension 13 directed towards the right (looking at the botton of the opening) and forming a bayonet slot. The slot or opening 12 in the sleeve 9 has a lateral or transverse extension 14 directed towards the left which also forms a bayonet slot, and the sleeve 9 also has a stud or pip 15 along side the opening 12, opposite the extension 14. This stud or pip is for engagement with the bayonet slot 13, to fix the retainer sleeve 9 in the body 1.

An assembly key is provided, which comprises a cylinder 16 which may slide in any direction in the sleeve 9 and which has a shoulder 17 limiting the extend to which it can penetrate into the sleeve 9. The cylinder 16 is also provided with a stud 18 located in such a manner that if the key is placed in the sleeve 9 with its shoulder 17 against the edge of the sleeve, said stud 18 is located at the exact level of the bayonet slot 14. The height of the stud is equal to, or slightly less than, the thickness of the sleeve 9.

In order to fit the sleeve 9 in the tubular body 1, it is inserted into the said body in such a manner that the openings 11 and 12 substantially coincide, and the key 16 is inserted, the stud 18 engaging in the said openings 11 and 12.

The key is pushed right in and rotated in the direction indicated by the arrow 19 (FIGURE 2). The stud 18 presses against the edge 12a of the opening 12, so that the sleeve 9 rotates with the key and its stud 15 engages in the bayonet slot 13. The sleeve 9 is then fixed to the body and all that remains is to withdraw the key. The sleeve 9 cannot rotate during operation as the wrist spring is immediately housed in the openings 11 and 12 on engagement.

The reverse operation is effected to remove the socket. The key 16 is inserted into the socket as for as it will go and rotated in the direction opposite to the arrow 19. The stud 18 passes into the bayonet slot 14 and then moves the sleeve 9 around with it so that the stud 15 comes out of its seating in slot 13 and comes to a stop against the edge 11a of the opening 11. All that then remains is to pull the key 16 out of the body 1 along with the bearing.

It will be apparent that the invention is not limited to the embodiment which has been described and illustrated, but that it covers all modifications, within the ambit of the following claims. For example, if the wrist has some engaging means other than a spring, a split ring 20 (FIGURE 3) may be housed in the body 1, said ring having one or more studs 21 engaging in the openings 11 and 12 and thus preventing the retainer sleeve 9 from pivoting with respect to the body.

I claim:
1. A dental head assembly comprising a tubular body having a coupling extension at its rear end engageable with coupling means on a dental engine, a spindle extending coaxially in said body, gripper means at the front end of the spindle for releasably gripping a dental tool, driver means at the rear end of the spindle engageable with driving means on the dental engine when said body is coupled to the latter, a front bearing in said body for rotatably supporting the spindle in the body adjacent the front end thereof, a rear bearing for rotatably supporting the spindle in the body adjacent the rear end of the spindle, a retainer sleeve in which said rear bearing is set and which is fitted in said body, internal shoulder means in the body engaged by the front end of said sleeve, the rear end of the sleeve being engageable with the coupling means of the dental engine when said body is coupled to the dental engine so that the coupling means retains the sleeve in position against said shoulder means, and bayonet joint means for fixing said sleeve in said body.

2. A dental head assembly according to claim 1, in which said bayonet joint means includes longitudinal slots in said retainer sleeve and said body to enable the engagement spring of a wrist joint to pass through said slots, said longitudinal slots being transversely extended in one direction for said retainer sleeve and in the opposite direction for said body, and a stud on said retainer sleeve for engagement in said slot in the body.

3. A dental head assembly according to claim 1, in which said bayonet joint means includes longitudinal slots in said retainer sleeve and said body, said longitudinal slots being transversely extended in one direction for said retainer sleeve and in the opposite direction for said body, and a stud on said retainer sleeve for engagement in said slot in the body, and further comprising a split ring housed in said body and having at least one stud engageable in said longitudinal slots in said body and said retainer sleeve for preventing rotation of said sleeve relative to said body.

References Cited by the Examiner
UNITED STATES PATENTS

| 1,675,873 | 7/1928 | Bauer | 32—26 |
| 2,865,101 | 12/1958 | Leonard | 32—26 |

RICHARD A. GAUDET, *Primary Examiner.*

ROBERT E. MORGAN, *Examiner.*